United States Patent
Zakharov

(10) Patent No.: US 9,798,503 B2
(45) Date of Patent: Oct. 24, 2017

(54) COLLABORATIVE REMOTE MAINTENANCE OF PRINTING DEVICES VIA COMMUNICATION WITH MULTIPLE SERVERS

(71) Applicant: KYOCERA Document Solutions Inc., Osaka (JP)

(72) Inventor: Oleg Zakharov, Concord, CA (US)

(73) Assignee: KYOCERA Document Solutions Inc. (JP)

( * ) Notice: Subject to any disclaimer, the term of this patent is extended or adjusted under 35 U.S.C. 154(b) by 70 days.

(21) Appl. No.: 14/551,421

(22) Filed: Nov. 24, 2014

(65) Prior Publication Data

US 2016/0147488 A1 May 26, 2016

(51) Int. Cl.
*G06F 3/12* (2006.01)
*H04L 29/06* (2006.01)

(52) U.S. Cl.
CPC .......... *G06F 3/1236* (2013.01); *G06F 3/1203* (2013.01); *G06F 3/1288* (2013.01); *H04L 63/0227* (2013.01); *H04L 63/102* (2013.01)

(58) Field of Classification Search
CPC .... G06F 3/1204; G06F 3/1224; G06F 3/1231; G06F 3/1236; G06F 3/1247; G06F 3/1287; G06F 3/1288; G06F 3/129; G06F 3/1203; G06F 3/1205; H04L 51/08; H04L 63/164; H04L 67/26; H04N 1/00244; H04N 1/00344; H04N 2201/0039; H04N 2201/0094
USPC ...................................... 358/1.14, 1.15, 1.16
See application file for complete search history.

(56) References Cited

U.S. PATENT DOCUMENTS

| | | | |
|---|---|---|---|
| 8,843,622 B1* | 9/2014 | Graham | H04L 67/24 709/206 |
| 2012/0194863 A1* | 8/2012 | Oshima | G06F 3/1236 358/1.15 |
| 2013/0010333 A1* | 1/2013 | Anand | G06F 3/1286 358/1.15 |
| 2014/0204412 A1* | 7/2014 | Pizot | G06F 3/1236 358/1.15 |
| 2014/0268236 A1* | 9/2014 | Ohara | H04N 1/00244 358/1.15 |

(Continued)

*Primary Examiner* — Benny Q Tieu
*Assistant Examiner* — Juan M Guillermety
(74) *Attorney, Agent, or Firm* — McDonnell Boehnen Hulbert & Berghoff LLP

(57) ABSTRACT

Example systems and related methods may relate to controlling a printing device remotely during real-time communication session. Namely, a system may include a first server and a second server. The first server may include an application configured to provide a user interface. The second server may be configured to communicate with the first server and a plurality of printer devices according to a data transport protocol. A request that includes a printer device identifier may be received by a controller. Based on the printer device identifier, a target printer device may be determined from the plurality of printer devices. A communication session may be established between the first server, the second server, and the target printer device. The communication session is configured according to the data transport protocol. The controller may be configured to control the target printer device based on the communication session.

13 Claims, 6 Drawing Sheets

(56) References Cited

U.S. PATENT DOCUMENTS

2015/0070727 A1* 3/2015 Asada ................... G06F 3/1268
                                                    358/1.15
2015/0124290 A1* 5/2015 Tajima .................. G06F 3/1236
                                                    358/1.15
2015/0277809 A1* 10/2015 Kim ..................... G06F 3/1204
                                                    358/1.15

* cited by examiner

| Device ID | Customer Name | Device Information | Description | Communication Session Time | Status |
|---|---|---|---|---|---|
| ABC123 | John Smith | [Model Name], [Serial Number], etc. | Paper jam | [Prior Date/Time] | Offline, Complete |
| DEF456 | Jane Doe | [Model Name], [Serial Number], etc. | Misaligned toner cartridge | [Current Date/Time] | Online |
| GHI789 | MetaCorp | [Model Name], [Serial Number], etc. | Annual maintenance | [Future Date/Time] | Offline, Pending |

Figure 5

COLLABORATIVE REMOTE MAINTENANCE OF PRINTING DEVICES VIA COMMUNICATION WITH MULTIPLE SERVERS

BACKGROUND

Printers, copiers, scanners, and multi-function devices (MFDs) may require occasional technical support and maintenance. Technical support and maintenance activities may include tasks such as collecting information about errors (fault codes), upgrading firmware, restarting devices, and fixing technical problems with the devices.

Traditionally, when such devices malfunction, a customer may report a technical issue to a customer support center. A first-level technical support individual at a support center may try to gather as much information as possible from the customer. After the initial information is gathered, the technical support person may determine whether the problem may be fixed by the customer over the phone or whether a customer service visit may be necessary. However, the initial information gathered from the customer may be incomplete, misleading, or insufficient, possibly because the customer may have limited technical skills regarding the maintenance of printing devices. Customer visits by a repair person may be costly and inefficient, particularly when the initial information from the customer is incorrect. For example, a repair person's inspection may uncover further problems and/or determine that replacement parts are needed. Thus, a subsequent repair visit may be necessary.

To provide more efficient and timely service, printing device vendors and service personnel may increasingly conduct communication sessions via the internet. However, the current remote communication methods may handle network resources inefficiently while providing such services. Thus, a need exists for a system and a method to establish efficient, remote, real-time communication sessions with printing devices over the internet.

SUMMARY

In a first aspect, a system is provided. The system preferably includes a first server, a second server, and a controller. The first server includes an application configured to provide a user interface. The second server is configured to communicate via an internet, according to a data transport protocol, with the first server and a plurality of printer devices. The plurality of printer devices is located behind a firewall. The controller is configured to receive, via the application, a request for a communication request. The communication request includes a printer device identifier. The controller is also configured to determine at least one target printer device from the plurality of printer devices based on the printer device identifier. The controller is additionally configured to establish a communication session between the first server, the second server, and the at least one target printer device according to the data transport protocol. The controller is further configured to control the at least one target printer device based on the communication session.

In a second aspect, a method is provided. The method preferably includes receiving, at a first server, a communication request via a user interface of an application. The communication request includes a printer device identifier. The first server is configured to communicate via an internet, according to a data transport protocol, with a plurality of printer devices and a second server. The plurality of printer devices is located behind a firewall. The method also includes determining at least one target printer device from the plurality of printer devices based on the printer device identifier. The method further includes establishing a communication session between the first server, the second server, and the at least one target printer device according to the data transport protocol. The method yet further includes controlling the at least one target printer device based on the communication session.

In a third aspect, a method is provided. The method preferably includes receiving, at a first server, a communication request via a user interface of an application. The communication request includes a printer device identifier and the first server is configured to communicate via an internet, according to a data transport protocol, with a plurality of printer devices and a second server. The method also includes responsive to receiving the communication request, retrieving information related to the printer device identifier from a database associated with the first server. The method yet further includes determining at least one target printer device from the plurality of printer devices based on the retrieved information. The method additionally includes establishing a communication session between the first server, the second server, and the at least one target printer device according to the data transport protocol. The method further includes responsive to the first server receiving target printer device information via the communication session, providing at least one command to the at least one target printer device via the communication session. The method includes closing the communication session.

Other aspects, embodiments, and implementations will become apparent to those of ordinary skill in the art by reading the following detailed description, with reference where appropriate to the accompanying drawings.

BRIEF DESCRIPTION OF THE FIGURES

FIG. 5 is a schematic block diagram illustrating several database entries, according to an example embodiment.

DETAILED DESCRIPTION

Figure 1:
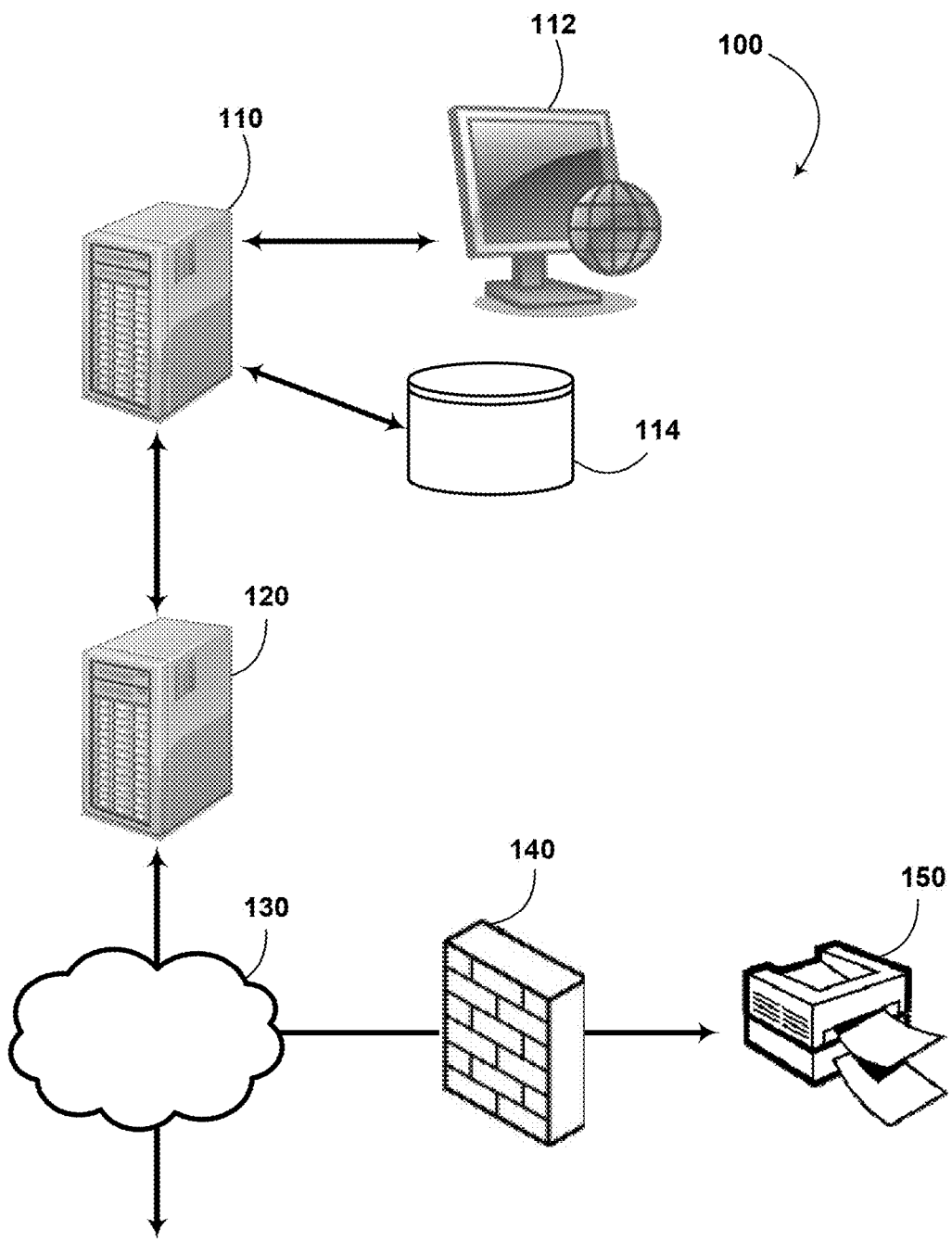
FIG. 1 is a schematic block diagram illustrating a system, according to an example embodiment.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

I. Overview

The present disclosure may relate to a method and system of communicating with a printing device remotely via a real time communication session over a network. Specifically, the present invention describes the method and the system that include establishing a bidirectional communication session according to a communication protocol between a central server and group of printing devices over a network, such as the Internet. The printing devices may be communicatively coupled to one or more local networks that are protected by a network firewall. The central server may be connected to a wide-area network and/or the public internet. A communication session could be established by using a communication protocol such as XMPP. The communication session may be conducted at a predetermined time or immediately upon request. The communication session may be scheduled based on a service request and/or based on customer information collected by a customer support person. The printing devices may be controlled based on commands sent via the communication session.

Network-connected printing devices are in many cases remotely-controllable. However, connecting such devices directly to the Internet may be prohibited or limited based on firewall settings and/or local network security policies. Existing approaches may be based on methods when printing devices are connected to a central server by utilizing Web Services over HTTP. In such approaches the printing device may periodically send an HTTP request that contains device-generated data. In response, the printing device may retrieve HTTP responses that contain server-generated data. This kind of connection is initiated by the printing device.

The time interval between sequential HTTP requests could be very short (every second or number of milliseconds) or much longer (hours, days, weeks). This type of connection is known as 'pooling'. While pooling communications appear to be bi-directional, they are not, because only the printing device may initiate an HTTP connection via a request. That is, the central server cannot initialize an HTTP connection with a printing device from outside a local network, due to the network firewall. Due to this limitation, real-time communication may be impossible using pooling connections with a printing device behind a network firewall.

Ideally, communication sessions may include bi-directional real time communications. That is, the communication session may offer the capability to send and retrieve data in both directions while accommodating a network firewall.

The present disclosure describes a method and system to establish a secure bidirectional network connection over a network for a possibly short timeframe to conduct a communication session. The communication session may include gathering information, upgrading firmware, troubleshooting, reporting, and/or remote control of the printing device.

Specifically, a command to a printing device could be sent from a central server over a network such as the Internet using a firewall-accommodating communication protocol. For example, an XMPP communication protocol may be used to establish a communication session. XMPP is a data transport protocol that may be operable to exchange XML elements between two endpoints (clients) on the network. Furthermore, a BOSH extension may be used to accommodate a network firewall and in order to utilize the HTTP transport layer instead of a socket layer, for example.

In some embodiments, the firewall-accommodating communication session need only be established at predetermined times, e.g. when needed for technical support or scheduled maintenance. For example, the XMPP connection may only last for several minutes over the course of a year. Thus, the XMPP connection need only be established a limited time so as to conserve network, server, and printing device resources.

II. System Examples

FIG. 1 is a schematic block diagram illustrating a system 100, according to an example embodiment. The system 100 may include a first server 110 and a user interface 112. Database 114 may be associated with the first server 110. The system 100 includes a second server 120 communicatively coupled to the first server 110 and a network 130. The network 130 may include a computer network such as an internet (e.g. the public Internet), an intranet, an extranet, an internetwork, a wide-area network (WAN), or a local area network (LAN). A printing device 150 may be communicatively coupled to the network 130 through a firewall 140. Other printing devices (not shown) may also be communicatively coupled to the network 130 through firewall 140 or another firewall.

The first server 110 may include an application configured to provide the user interface 112. The second server 120 may be configured to communicate with the first server 110 and the printer device 150 via the network 130. One or more firewalls other than firewall 140 may be included in system 100. For example, a firewall may be included between the first server 110 and the user interface 112. Other firewalls may be present at other network locations in system 100.

The database 114 may be configured to store a list of associations between the respective printer devices and printer device identifiers. That is, database 114 may provide a means to identify a particular target printer device from a plurality of printer devices with, for example, a look-up table that includes an association between a printer device and its corresponding printer device identifier.

The printing device 150, the second server 120, and the first server 110 may be communicatively coupled via wireless or wired communication links. The communication links may be enabled by various network hardware devices such as network interface controllers (NICs), hubs, switches, routers, modems, and firewalls. The printing device 150, the second server 120, and the first server 110 may be configured to communicate via a data transport protocol.

In an example embodiment, the data transport protocol may include extensible messaging and presence protocol (XMPP). XMPP is a communication protocol that may be operable to facilitate near real time messaging between clients. XMPP uses a client-server architecture; in other words, an XMPP server may facilitate data exchange between clients using XMPP communication sessions.

In the case where XMPP is used as the data transport protocol, the first server and the printing device may be running XMPP client instances. The second server may be running an XMPP server instance.

The data transport protocol may further include a bidirectional stream over synchronous HTTP (BOSH) transport protocol. BOSH is an extension to the XMPP protocol, which makes the transport protocol "firewall-friendly", or permits bi-directional data transmissions through firewalls. In such a scenario, the target printer device may be running an XMPP BOSH client instance.

Other data transport protocols are possible and contemplated within the scope of this disclosure. For example, the data transport protocol may be another firewall-accommodating protocol. Such a firewall-accommodating protocol may be operable to provide bidirectional data transport through a firewall, such as firewall 140.

The firewall 140 may include a network device operable to control network access and security policies. For example, the firewall 140 may restrict access to the printing device 150 from users and/or computing nodes outside the local network of the printing device 150. In some embodiments, firewall 140 may be configured according to security policies adopted by network administrators. The firewall 140 may further be configured to prevent unauthorized access, misuse, modification, or attacks on network resources, such as the printing device 150.

The first server 110 and/or the second server 120 may include a controller. Alternatively, the controller may be separate from, but still communicatively coupled to at least one of, the first server 110 and the second server 120. The controller may be configured to receive, via the application, a communication request. The communication request includes a printer device identifier. The controller may also be configured to determine at least one target printer device from a plurality of printer devices based on the printer device identifier. The controller is configured to establish a communication session between the first server, the second server, and the at least one target printer device according to the data transport protocol. The controller may also be configured to control the at least one target printer device based on the communication session.

In some embodiments, the controller may be configured to receive a communication session start time. The controller may also be configured to receive configuration information regarding the configuration of the communication session. The configuration information may include a uniform resource locator (URL) of the first server and/or the second server as well as access credentials. The access credentials may allow authorization and/or authentication in order to establish a secure link with a known/trusted third party, for example. The controller may establish the communication session when a system time is the communication session start time. Further, the communication session is configured according to the configuration information.

Figure 2:
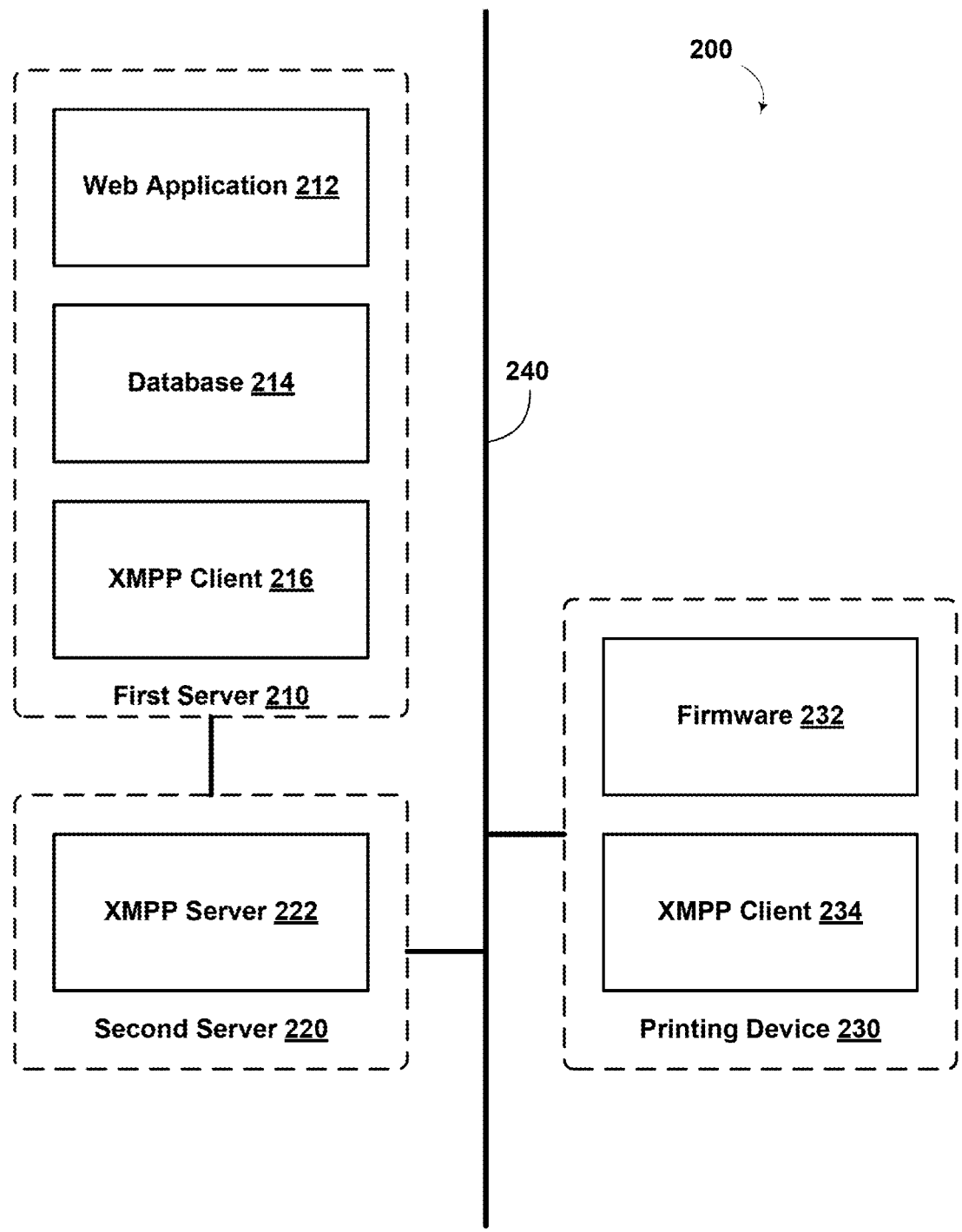
FIG. 2 is a schematic block diagram illustrating a system, according to an example embodiment.

FIG. 2 is a schematic block diagram illustrating a system 200, according to an example embodiment. System 200 includes a first server 210, a second server 220, and a printing device 230. The first server 210 may include a web application 212, a database 214, and an XMPP client instance 216. The web application 212 may provide a user interface.

The second server 220 may include an XMPP server instance 222. The printing device 230 includes firmware 232 and an XMPP client instance 234. The first server 210 may be communicatively coupled to the second server 220. The second server 220 may be communicatively coupled to a network 240, such as the public Internet. Network 240 may additionally or alternatively include a different type of network, such as a wide-area network or a local area network. Other types of networks are possible. The second server 220 may be configured to communicate with the first server 210 and the printing device 230 according to a data transport protocol. The printing device 230 may be located behind a network firewall, such as firewall 140 described and illustrated in reference to FIG. 1.

III. Method Examples

Figure 3A:
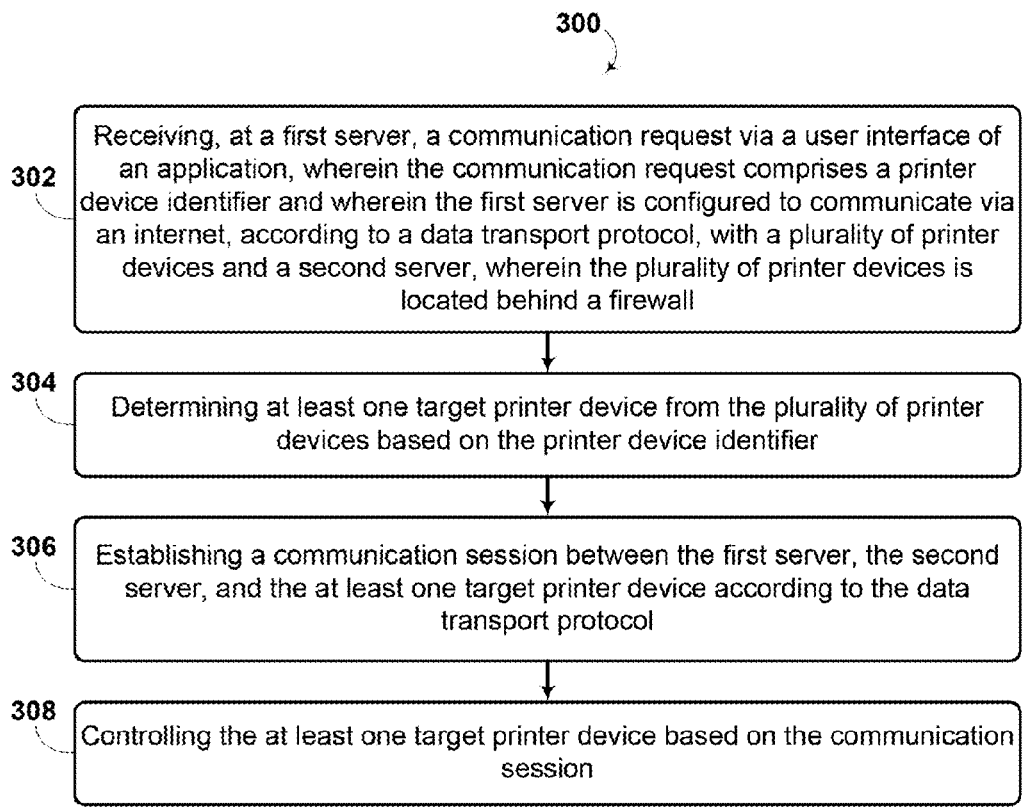
FIG. 3A is a flow diagram illustrating a method, according to an example embodiment.

FIG. 3A is a flow diagram illustrating a method 300, according to an example embodiment. Although FIG. 3A illustrates method 300 as including certain blocks in a particular order, it should be understood that blocks may be added, subtracted, and/or carried out in a different order. Furthermore some or all of the blocks of method 300 may be carried out by system 100 or system 200 as illustrated and described in reference to FIG. 1 and FIG. 2.

Block 302 includes a first server receiving a communication request via a user interface of an application. The communication request includes a printer device identifier. The first server is configured to communicate via an internet, according to a data transport protocol. Specifically, the first server may communicate with a plurality of printer devices and a second server via the internet, according to the data transport protocol. The plurality of printer devices is located behind one or more firewalls.

The data transport protocol may include a firewall-accommodating communication protocol such as the BOSH extension of the XMPP protocol as described elsewhere herein. In such a scenario, the first server and a plurality of printing devices may be configured to run a client instance of XMPP. The second server may be configured to run a server instance of XMPP. Other firewall-accommodating communication protocols are possible.

Block 304 includes determining at least one target printer device from the plurality of printer devices based on the printer device identifier. As an example, a controller associated with the first server and/or the second server may determine that the printer device identifier from the communication request corresponds to a particular printer device from the plurality of printer devices. The controller may call the particular printer device a target printer device.

Block 306 includes establishing a communication session between the first server, the second server, and the at least one target printer device according to the data transport protocol. For example, the controller may establish a communication session between the first server and the target printer device via the second server, all of which may be running an instance of a firewall-accommodating communication protocol, such as XMPP.

Block 308 includes controlling the at least one target printer device based on the communication session. Controlling the target printer device may include obtaining information from the target printer device, sending at least one command to the target printer, and the target printer executing the at least one command. In other words, the target printer device may be controlled remotely via the communication session.

Figure 3B:
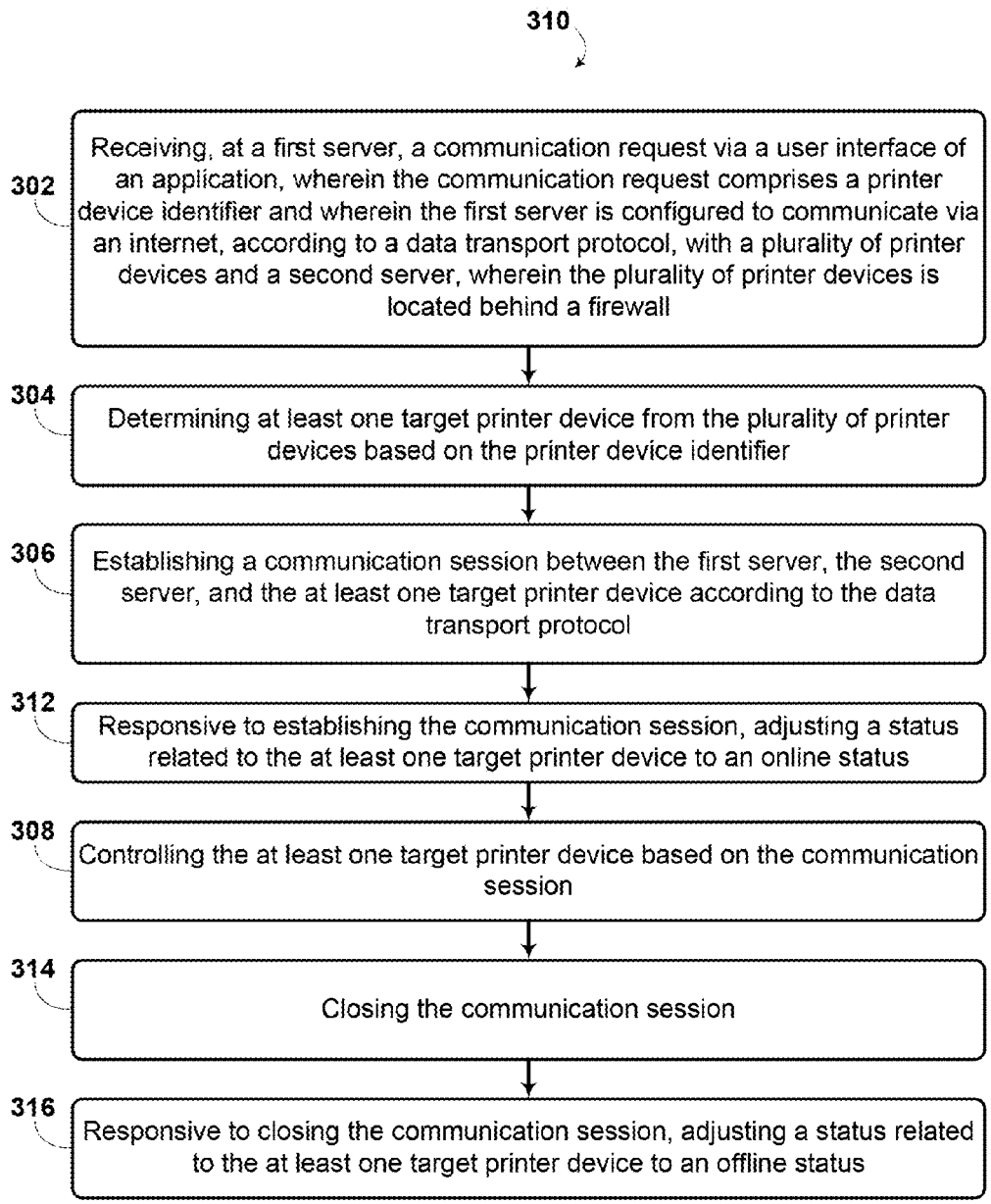
FIG. 3B is a flow diagram illustrating a method, according to an example embodiment.

FIG. 3B is a flow diagram illustrating a method 310, according to an example embodiment. Although FIG. 3B illustrates method 310 as including certain blocks in a particular order, it should be understood that blocks may be added, subtracted, and/or carried out in a different order. Furthermore some or all of the blocks of method 310 may be carried out by system 100 or system 200 as illustrated and described in reference to FIG. 1 and FIG. 2.

Method 310 may include blocks described in reference to method 300, such as block 302, 304, 306, and 308. Block 312 may further include responsive to establishing the communication session, adjusting a status related to the at least one target printer device to an online status. As described herein, adjusting the status related to the at least one target printer device may include modifying or storing, at a database, status information or a network availability status. The status information or network availability status may reflect an actual status of the at least one target printer device. In other words, once the communication session is established with the target printer device over a firewall-accommodating protocol, the controller may adjust online/offline status information within a database to reflect the actual "online" status of the target printer device.

Block 314 may include closing the communication session. The communication session may be closed by the controller or the printer device. The communication session may also be closed by timing out, for instance, if the communication session is unused by one or more parties to the communication session for more than a predetermined threshold time.

Block 316 includes responsive to closing the communication session, adjusting a status related to the at least one target printer device to an offline status.

Figure 4:
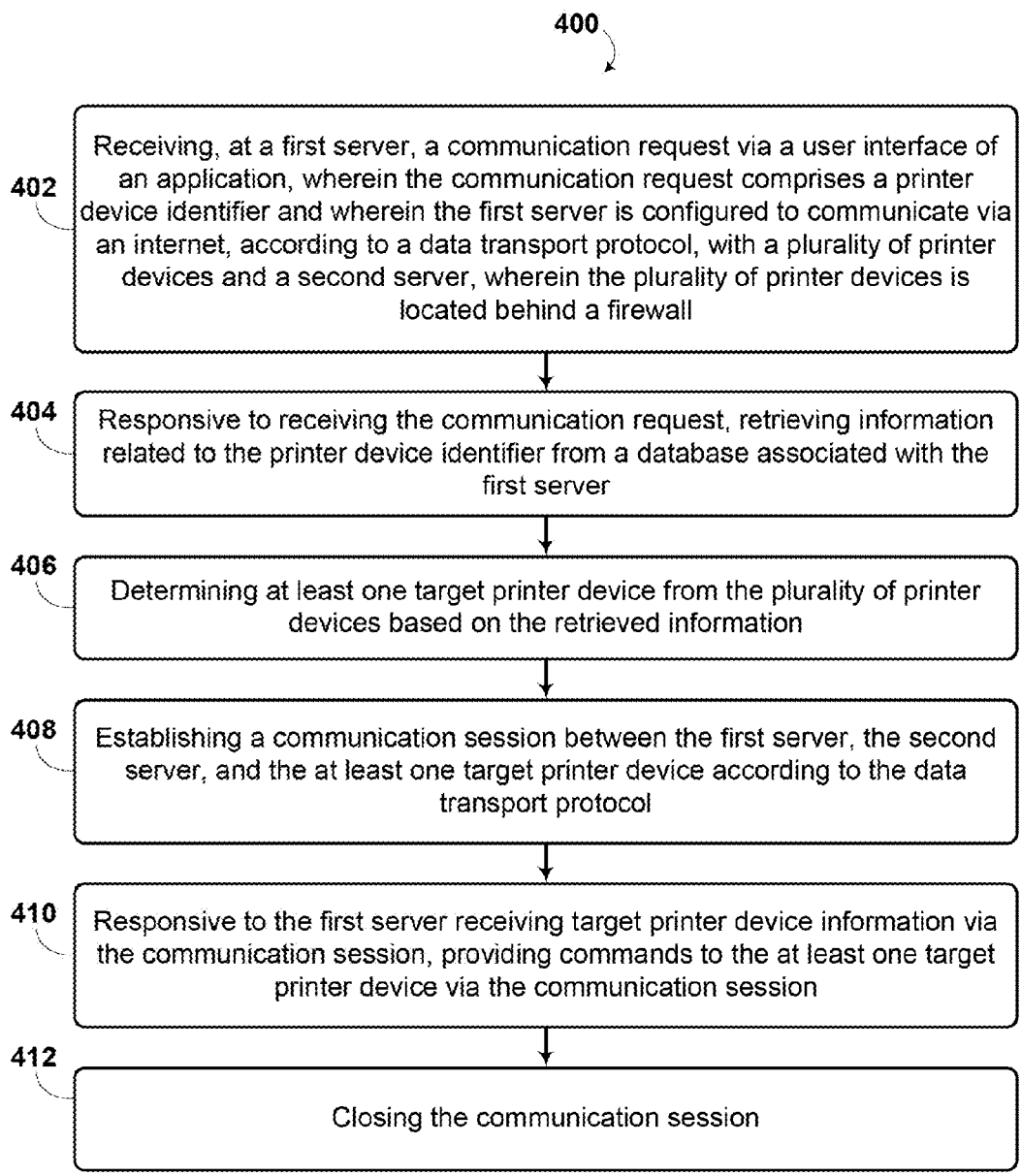
FIG. 4 is a flow diagram illustrating a method, according to an example embodiment.

FIG. 4 is a flow diagram illustrating a method 400, according to an example embodiment. Although FIG. 4 illustrates method 400 as including certain blocks in a particular order, it should be understood that blocks may be added, subtracted, and/or carried out in a different order. Furthermore, some or all of the blocks of method 400 may be carried out by system 100 or system 200 as illustrated and described in reference to FIG. 1 and FIG. 2.

Block 402 may include receiving, at a first server, a communication request via a user interface of an application. The communication request includes a printer device identifier. The first server is configured to communicate via an internet, according to a data transport protocol, with a plurality of printer devices and a second server. The plurality of printer devices is located behind a firewall. Block 402 may be similar or identical to block 302.

Block 404 includes, responsive to receiving the communication request, retrieving information related to the printer device identifier from a database associated with the first server. The database may be similar or identical to database 114 as described in reference to FIG. 1. As such, the database may be configured to store a list of associations between the respective printer devices and printer device identifiers. In such a scenario, a controller associated with the first server and/or the second server may query the database based on the printer device identifier. The database may return retrieved information corresponding to one or more printer devices. The retrieved information may include a network address of the printer device and/or other identifying information to enable a communication session between the first server, the second server, and a particular printer device.

Block 406 includes determining at least one target printer device from the plurality of printer devices based on the retrieved information. In some cases, the at least one target printer may be determined based on a correspondence between the printer device identifier and the retrieved information. Additionally or alternatively, the at least one target printer may be determined based on the retrieved information corresponding to a set of printer devices, such as a particular model of printer device and printer devices behind a particular firewall.

Block 408 includes establishing a communication session between the first server, the second server, and the at least one target printer device according to the data transport protocol. In an example embodiment, the controller may initiate the communication session by opening a communication link between, for instance, the first server and the at least one target printer device. The communication link may be conducted using a firewall-accommodating communication protocol. In an example embodiment, the firewall-accommodating communication protocol may include the BOSH extension of the XMPP communication protocol. Other communication protocols are possible to provide bidirectional data transport through the firewall.

Block 410 includes, responsive to the first server receiving target printer device information via the communication session, providing at least one command to the at least one target printer device via the communication session. In other words, the first server may provide commands to the target printer based on information it has received about that target printer. The commands are provided via the firewall-accommodating communication session.

For example, the first server may receive information about a paper jam on the target printer device. In response, the first server may provide commands to the target printer device to resolve the problem. In such a scenario, commands may be provided to, for example, reverse the feed mechanism to back out the paper and/or provide a message for personnel who may be able to physically interact with the target printer device.

In another example embodiment, the first server may determine that the target printer device requires a firmware upgrade. Accordingly, the first server may provide commands to install a new firmware version in the target printer device.

Block 412 includes closing the communication session. In an example embodiment, the controller may close the communication session in response to the first server and/or the target printer device electing to terminate the communication session. In other embodiments, the controller may close the communication session in response to no communications from one or both of the first server and the target printer device for a predetermined period of time, e.g. a timeout. Other events may trigger closing the communication session.

Method 400 may optionally include other blocks. For example, method 400 may include, responsive to establishing the communication session, adjusting a status related to the at least one target printer device to an online status. That is, after initiating the communication session, the controller may adjust a database entry related to the target printer device. The adjustment may include changing a status of the target printer device to "online" within the database.

Method 400 may optionally include, responsive to closing the communication session, adjusting a status related to the at least one target printer device to an offline status. Similar to the preceding paragraph, the controller may adjust a database entry related to the target printer device. Specifically, the status of the target printer may be set to "offline" within the database.

Method 400 may also optionally include determining a communication session start time based on the retrieved information. In some embodiments, the retrieved information may include an explicit communication session start time. In other example embodiments, the communication session start time may be determined from a predetermined schedule as well as the retrieved information. For example, the retrieved information may include the model of the printer device. A predetermined schedule may indicate that the particular model of printer device from the retrieved information should receive an annual maintenance on a predetermined date. In such a way, the communication session start time may be determined.

Method 400 may also include establishing the communication session in response to a system time (e.g. a system clock, a global clock, or another timing means) being the communication session start time.

The method 400 may optionally include receiving configuration information. As described above, the configuration information may include credentials to establish a secure communication session as well as URLs for the first server and/or the second server. The communication session is configured according to the configuration information.

The method 400 may optionally include the first server receiving information about the at least one target printer device and displaying the information via the user interface of the application. In such a manner, a user of the user interface, e.g. a technical support person, may be able to receive information about the target printer device and/or provide commands or other information to the target printer device during the communication session.

The method 400 may further include a database associated with the first server that is configured to store a list of associations between the plurality of printer devices and printer device identifiers. That is, the database may include a plurality of entries related to the plurality of printer devices. The plurality of entries may include associations between the plurality of printer devices and the printer device identifiers. In some embodiments, determining the at least one target printer device from the plurality of printer devices includes the first server retrieving the list of associations from the database.

FIG. 5 is a schematic block diagram 500 illustrating several database entries, according to an example embodiment. The database entries may include several data fields 510. For example, the data fields 510 may include Device ID, Customer Name, Device Information, Description, Communication Session Time, and Status. Other data fields 510 are contemplated herein and may relate to any matter in which remote communication, maintenance, problem resolution, and/or troubleshooting may be performed.

Entry 512 may be related to Device ID "ABC123". The printer device of entry 512 may be owned, in the possession of, or otherwise associated with "John Smith". Entry 512 may include a variety of device information such as the model name, serial number, etc. Entry 512 may include a description of a particular condition of the printer device, such as a paper jam. Entry 512 may include a prior date and/or time, which may indicate that the problem or condition arose in the past. Entry 512 may include a current status, such as "Offline, Complete". That is, Device ID ABC123 may be offline (e.g. not currently linked to the first server or the second server via a communication session) and the problem may have been resolved.

Entry 514 may include printer device ID "DEF456", which may be associated with "Jane Doe". Entry 514 may include information about the specific printer device, such as model name, serial number, etc. Entry 514 may indicate a description as "Misaligned toner cartridge". Furthermore, entry 514 may include the current date/time, and an "online" status. Thus, entry 514 may indicate that device DEF456 is currently linked to the first server and the second server via a communication session. The communication session may relate to resolving a misaligned toner cartridge issue. Accordingly, various commands may be provided to the printer device, such as a command to realign the toner cartridge and print a test page, as an example.

Entry 516 may include printer device ID "GHI789", which may be associated with "MetaCorp". Entry 516 may include information about the specific printer device, similar to entries 512 and 514, including the model name, serial name, etc. Entry 516 may indicate a description of "Annual maintenance" with an indicated communication session time of a future date/time. Furthermore, entry 516 may include "Offline, Pending", which may indicate that an annual maintenance communication session is planned for the future date/time.

Respective database entries may be added in response to a customer request, printer device request, or by technical support personnel, for example. Respective database entries may be updated as communication sessions are established and closed with the various printer devices. Furthermore, some database entries may be modified or removed for other reasons. For instance, some technical issues may be addressed without a communication session, in which case the respective entry may be removed from the database and/or include a status of complete or resolved.

While various examples and embodiments have been disclosed, other examples and embodiments will be apparent to those skilled in the art. The various disclosed examples and embodiments are for purposes of illustration and are not intended to be limiting, with the true scope and spirit being indicated by the following claims.

What is claimed is:

1. A system comprising:
a first server configured to provide a user interface, wherein the first server is further configured to communicate with a plurality of printer devices according to a first data transport protocol, wherein the first data transport protocol comprises web services over HTTP/HTTPS;
a second server configured to communicate via an internet, according to a second data transport protocol, with the first server and the plurality of printer devices, wherein the plurality of printer devices is located behind a firewall, wherein the second data transport protocol comprises an XMPP communication protocol; and
a controller, comprising a client for the XMPP communication protocol running on the first server, communicatively coupled to the first server and the second server utilizing the XMPP communication protocol wherein the controller is configured to:
receive a communication request, the communication request comprising a printer device identifier and a maintenance request;
receive a communication session start time and configuration information;
responsive to receiving the communication request, determine at least one target printer device from the plurality of printer devices based on the printer device identifier and determine a maintenance command according to the maintenance request;
further responsive to receiving the communication request, establish a first communication session according to the first data transport protocol and a second communication session according to the second data transport protocol, wherein the first communication session is configured to allow a first direct connection between the first server and the at least one target printer device, wherein the second communication session is configured to allow a second direct connection between the second server and the at least one target printer device, wherein establishing the second communication session is responsive to a system time being the communication session start time, wherein the second communication session is configured according to the configuration information;
transmit the maintenance command to the at least one target printer device; and
close the second communication session.

2. The system of claim 1 wherein the first server communicates with the second server via an XMPP client instance running on the first server and an XMPP server instance running on the second server.

3. The system of claim 2 wherein the second data transport protocol further comprises a bidirectional stream over synchronous HTTP, BOSH, transport protocol, and wherein the at least one target printer device is running an XMPP BOSH client instance.

4. The system of claim 1 wherein the second data transport protocol further comprises a firewall-accommodating protocol, wherein the firewall-accommodating protocol is operable to provide bidirectional data transport through the firewall.

5. The system of claim 1 wherein a database associated with the first server is configured to store a list of associations between the plurality of printer devices and printer device identifiers and wherein determining the at least one target printer device from the plurality of printer devices comprises the first server retrieving the list of associations from the database.

6. The system of claim 1, wherein the controller is further configured to, during the second communication session:
receive information indicative of a status of the at least one target printer device;
responsive to the status corresponding to a technical problem, determine a further maintenance command based on the technical problem; and
provide the further maintenance command to the at least one target printer device.

7. A method comprising:
receiving, at a first server, a communication request and a maintenance request via a user interface, wherein the communication request comprises a printer device identifier and wherein the first server is configured to communicate via an internet, according to a first data transport protocol, with a plurality of printer devices and a second server, wherein the plurality of printer devices is located behind a firewall, wherein the first data transport protocol comprises web services over HTTP/HTTPS;
responsive to receiving the communication request, determining at least one target printer device from the plurality of printer devices based on the printer device identifier;
receiving a communication session start time and configuration information;
further responsive to receiving the communication request, establishing a first communication session according to the first data transport protocol and a second communication session according to a second data transport protocol, wherein the first communication session is configured to allow a first direct connection between the first server and the at least one target printer device, wherein establishing the second communication session is responsive to a system time being the communication session start time and wherein the second communication session is configured according to the configuration information;
wherein the second communication session is configured to allow a second direct connection between the second server and the at least one target printer device, wherein the second data transport protocol comprises an XMPP communication protocol;
determining a maintenance command according to the maintenance request;
providing the maintenance command to the at least one target printer device; and
in response to the at least one target printer device executing the maintenance command,
closing the second communication session.

8. The method of claim 7 further comprising:
responsive to establishing the second communication session, adjusting a status related to the at least one target printer device to an online status; and
responsive to closing the second communication session, adjusting a status related to the at least one target printer device to an offline status.

9. The method of claim 7 further comprising the first server receiving information about the at least one target printer device and displaying the information via the user interface.

10. The method of claim 7 wherein the first server communicates with the second server via an XMPP client instance running on the first server and an XMPP server instance running on the second server.

11. The method of claim 10 wherein the second data transport protocol further comprises a bidirectional stream over synchronous HTTP, BOSH, transport protocol, and wherein the at least one target printer device is running an XMPP BOSH client instance.

12. The method of claim 7 wherein the second data transport protocol further comprises a firewall-accommodating protocol, wherein the firewall-accommodating protocol is operable to provide bidirectional data transport through the firewall.

13. The method of claim 7 wherein a database associated with the first server is configured to store a list of associations between the plurality of printer devices and printer device identifiers and wherein determining the at least one target printer device from the plurality of printer devices comprises the first server retrieving the list of associations from the database.

* * * * *